United States Patent
AlMatouq et al.

(10) Patent No.: US 11,447,687 B2
(45) Date of Patent: Sep. 20, 2022

(54) ENHANCING RHEOLOGICAL PROPERTIES OF FOAM USING ALOE-BARBADENSIS GEL

(71) Applicant: Saudi Arabian Oil Company, Dhahran (SA)

(72) Inventors: Hana AlMatouq, Qatif (SA); Zuhair AlYousif, Dhahran (SA); Amin Alabdulwahab, AlHassa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/036,666

(22) Filed: Sep. 29, 2020

(65) Prior Publication Data

US 2022/0098471 A1  Mar. 31, 2022

(51) Int. Cl.
*C09K 8/594* (2006.01)
*E21B 43/16* (2006.01)
*C09K 8/584* (2006.01)
*C09K 8/588* (2006.01)

(52) U.S. Cl.
CPC .............. *C09K 8/594* (2013.01); *C09K 8/584* (2013.01); *C09K 8/588* (2013.01); *E21B 43/16* (2013.01)

(58) Field of Classification Search
CPC ........................................................ E21B 21/00
See application file for complete search history.

(56) References Cited

U.S. PATENT DOCUMENTS

| | | |
|---|---|---|
| 4,300,634 A | 11/1981 | Clampitt |
| 4,562,097 A | 12/1985 | Walter et al. |
| 4,676,316 A | 6/1987 | Mitchell |
| 4,703,797 A | 11/1987 | Djabbarah |
| 5,129,457 A | 7/1992 | Sydansk |
| 5,203,411 A | 4/1993 | Dawe et al. |
| 5,706,895 A * | 1/1998 | Sydansk .................. C09K 8/50 166/294 |
| 5,780,395 A | 7/1998 | Sydansk |
| 8,163,678 B2 | 4/2012 | Campbell et al. |

(Continued)

FOREIGN PATENT DOCUMENTS

| | | |
|---|---|---|
| AU | 731208 B2 | 3/2001 |
| CN | 101125243 A | 2/2008 |

(Continued)

OTHER PUBLICATIONS

Bataweel, M.A. et al.; "Rheological Study for Surfactant-Polymer and Novel Alkali-Surfactant-Polymer Solutions" SPE 150913, North Africa Technical Conference & Exhibition, Cairo, Feb. 20-22, 2012; pp. 1-16.

(Continued)

*Primary Examiner* — Angela M DiTrani Leff
*Assistant Examiner* — Avi T Skaist
(74) *Attorney, Agent, or Firm* — Bracewell LLP; Constance G. Rhebergen; Brian H. Tompkins

(57) ABSTRACT

A surfactant foam for enhanced oil recovery (EOR) gas injection that includes a surfactant and *Aloe vera* gel. The surfactant may be a methanol surface active agent foamer. The surfactant foam may be generated in-situ from an injected gas (such as air or nitrogen), water (such as seawater), a surfactant, and *Aloe vera* gel. A process for enhancing oil recovery in a hydrocarbon reservoir using the surfactant foam and for manufacturing the foam are also provided.

7 Claims, 4 Drawing Sheets

(56) References Cited

U.S. PATENT DOCUMENTS

| | | | |
|---|---|---|---|
| 8,985,206 | B2 | 3/2015 | Morvan et al. |
| 9,469,804 | B2 | 10/2016 | Altamirano et al. |
| 2008/0167445 | A1 | 7/2008 | Podella et al. |
| 2011/0315384 | A1* | 12/2011 | Miquilena ............. C09K 8/512 166/305.1 |
| 2012/0157354 | A1* | 6/2012 | Li ............................ C09K 8/68 507/129 |
| 2014/0251625 | A1* | 9/2014 | Nelson .................... C09K 8/88 166/308.5 |
| 2016/0347990 | A1 | 12/2016 | Vanzin et al. |
| 2018/0119001 | A1 | 5/2018 | Chaalal |

FOREIGN PATENT DOCUMENTS

| | | |
|---|---|---|
| CN | 102140338 B | 8/2011 |
| WO | 2015135777 A2 | 9/2015 |

OTHER PUBLICATIONS

Chaalal, Omar; "Innovation in Enhanced Oil Recovery" Recent Advances in Petrochemical Science, vol. 5, Issue 2—May 2018; pp. 0019-0021.

Chen, Z. et al.; "Hydraulic Predictions for Polymer-Thickened Foam Flow in Horizontal and Directional Wells" SPE/IADC 105583, SPE/IADC Drilling Conference, Amsterdam, Feb. 20-22, 2007; pp. 1-10.

Hibbeler, J.C. et al.; "Cost-Effective Gas Control: A Case Study of Surfactant Cement" SPE 25323, SPE Asia Pacific Oil & Gas Conference & Exhibition, Singapore, Feb. 8-10, 1993; pp. 109-116.

Hussain, S.M. Shakil et al.; "Amido-Amine-Based Cationic Gemini Surfactants: Thermal and Interfacial Properties and Interactions with Cationic Polyacrylamide" J Surfact Deterg (2017) 20; pp. 47-55.

Kamal, Muhammad Shahzad et al.; "A Zwitterionic Surfactant Bearing Unsaturated Tail for Enhanced Oil Recovery in High-Temperature High-Salinity Reservoirs" J Surfact Deterg (2018); pp. 1-10.

Lake, Larry W.; "Chemical Flooding" Petroleum Engineering Handbook, Chapter 47, Jan. 1987; pp. 47-1 to 47-26.

Pardo, C.W. et al.; "Foam Recompletion of High-Angle, Low-Pressure Dry Gas Wells, Offshore Louisiana" SPE 18844, SPE Production Operations Symposium, Oklahoma City, Mar. 13-14, 1989; pp. 223-228.

Thomas, R.L. et al.; "Field Validation of a Foam Diversion Model: A Matrix Stimulation Case Study" SPE 39422, SPE International Symposium on Formation Damage Control, Lafayette, Feb. 18-19, 1998; pp. 1-16.

* cited by examiner

ENHANCING RHEOLOGICAL PROPERTIES OF FOAM USING ALOE-BARBADENSIS GEL

BACKGROUND

Field of the Disclosure

The present disclosure generally relates to enhancing oil recovery from a reservoir formation. More specifically, embodiments of the disclosure relate to gas injection and surfactant foams used in gas injection.

Description of the Related Art

Gas injection may be used in petroleum reservoirs as an enhanced oil recovery (EOR) technique to improve oil recovery. When the gas is injected into the reservoir, it will sweep and recover the oil as long as the injected gas is miscible with the oil. One of the challenges in gas injection in EOR is the difference in density and viscosity between the injected gas and the reservoir oil. For example, commonly used gases such as carbon dioxide ($CO_2$) and nitrogen ($N_2$) have relatively lower densities and viscosities than oil. The differences in density and viscosity can cause gravity override and viscous fingering issues, thus affecting the overall sweep efficiency and resulting in an inefficient recovery process.

SUMMARY

To overcome some the challenges of using gas injection, surfactant foams may be used with the injected gas to improve gas mobility and improve oil recovery. Surfactant foams may increase the apparent viscosity of the gas and reduce the relatively permeability of the gas, thereby reducing the gas mobility. A consideration in the use of surfactant foams is the stability of the foam, which is a function of factors that include reservoir temperature, salinity, and rock adsorption.

In certain instances, the foam is generated by mixing the gas with water and a surfactant. However, the generated foam may be unstable and may not have a strength suitable for reservoir conditions. Further, the generated foams may collapse prematurely due to various factors, such as reservoir temperature, salinity, acidity, and rock adsorption. An unstable or collapsed foam will not provide the improvements in gas properties useful for achieving an improved oil recovery.

In one embodiment, a method for enhancing oil recovery in a hydrocarbon-containing reservoir is provided. The method includes introducing a gas into a well accessing the hydrocarbon-containing reservoir and introducing a solution into the well such that the solution and gas form a foam. The solution includes water, a surfactant, and Aloe vera gel.

In some embodiments, the solution consists of water, the surfactant, and Aloe vera gel. In some embodiments, the surfactant is a methanol surface active agent foamer. In some embodiments, the surfactant is a combination of an amphoteric alkyl amine and propan-2-ol. In some embodiments, the water is seawater. In some embodiments, the gas consists of air. In some embodiments, the gas consists of nitrogen. In some embodiments, the method includes preparing the solution at the surface before introducing the solution into the well. In some embodiments, the surfactant has a concentration in the solution of 5 gallon per thousand gallon (gpt) to 15 gpt. In some embodiments, the Aloe vera gel has a concentration in the solution of 1 weight % (1 wt %) to 3 wt %.

In another embodiment, a solution for forming a foam for enhancing oil recovery in a hydrocarbon-containing reservoir. The solution includes water, a surfactant, and Aloe vera gel. In some embodiments, the solution consists of water, the surfactant, and Aloe vera gel. In some embodiments, the surfactant is a methanol surface active agent foamer. In some embodiments, the surfactant is a combination of an amphoteric alkyl amine and propan-2-ol. In some embodiments, the water is seawater. In some embodiments, the surfactant has a concentration in the solution of 5 gallon per thousand gallon (gpt) to 15 gpt. In some embodiments, the Aloe vera gel has a concentration in the solution of 1 weight % (1 wt %) to 3 wt %.

In another embodiment, a foam for enhancing oil recovery in a hydrocarbon-containing reservoir is provided. The foam includes a gas, water, a surfactant, and Aloe vera gel. In some embodiments, the surfactant is a methanol surface active agent foamer. In some embodiments, the surfactant is a combination of an amphoteric alkyl amine and propan-2-ol. In some embodiments, the water is seawater. In some embodiments, the gas includes nitrogen. In some embodiments, the gas consists of air. In some embodiments, the gas consists of nitrogen. In some embodiments, the gas consists of air. In some embodiments, the gas consists of nitrogen. In some embodiments, the surfactant has a concentration in the solution of 5 gallon per thousand gallon (gpt) to 15 gpt. In some embodiments, the Aloe vera gel has a concentration in the solution of 1 weight % (1 wt %) to 3 wt %.

In another embodiment, a method of manufacturing a solution for generating a foam for enhancing oil recovery in a hydrocarbon-containing reservoir is provided. The method includes obtaining water and mixing a surfactant and Aloe vera gel with the water to form the solution. In some embodiments, the water is seawater. In some embodiments, the surfactant has a concentration in the solution of 5 gallon per thousand gallon (gpt) to 15 gpt. In some embodiments, Aloe vera gel has a concentration in the solution of 1 weight % (1 wt %) to 3 wt %.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure includes a surfactant foam for enhanced oil recovery (EOR) gas injection that includes a surfactant and *Aloe vera* (which may include or be referred to as *Aloe* barbadensis) gel. In some embodiments, the surfactant is a methanol surface active agent foamer. In some embodiments, the methanol surface active agent foamer is amphoteric alkyl amine and propane-2-ol. An example *Aloe vera* gel may include water, polysaccharides (for example, glucose and mannose), amino acids, lipids, sterols, tannins, and enzymes. In some embodiments, the surfactant foam may not include a chemical gel or a polymer other than those found in the *Aloe vera* gel. Embodiments of the disclosure also include a process for enhancing oil recovery in a hydrocarbon reservoir using the surfactant foam.

In some embodiments, the *Aloe vera* gel used in the surfactant foam is obtained directly from an *Aloe vera* plant (for example, from the leaves of an *Aloe vera* plant). In such embodiments, the *Aloe vera* gel may be untreated *Aloe vera* gel. As used in the disclosure, the term "untreated" refers to not treated with an alkali or an acid, not chemically altered, and without any reaction process with a reagent.

In some embodiments, the water used to prepare the surfactant foam may be seawater (for example, water having a salinity in the range of about 30,000 to about 40,000 parts-per-million (ppm) total dissolved solids (TDS)). In other embodiments, the water be an artificial brine, a natural brine, brackish water, or formation water.

In some embodiments, the surfactant foam may be generated in-situ from an injected gas, water (for example, seawater), a surfactant, and *Aloe vera* gel. In some embodiments, preparation of the surfactant foam may include mixing the surfactant and *Aloe vera* gel with the water at the surface. In such embodiments, the surfactant may have a concentration the range of about 5 gallon per thousand gallon (gpt) to about 15 gpt. In some embodiments, the *Aloe vera* gel may have a concentration in the range of about 1 weight % (wt %) to about 3 wt %.

In some embodiments, a surfactant foam generated from air, seawater, surfactant, and *Aloe vera* gel may have a viscosity of at least 40 cP at 25° C. In some embodiments, a surfactant foam generated from nitrogen ($N_2$), seawater, surfactant, and *Aloe vera* gel may have a viscosity of at least 100 cP at 25° C.

Figure 1:
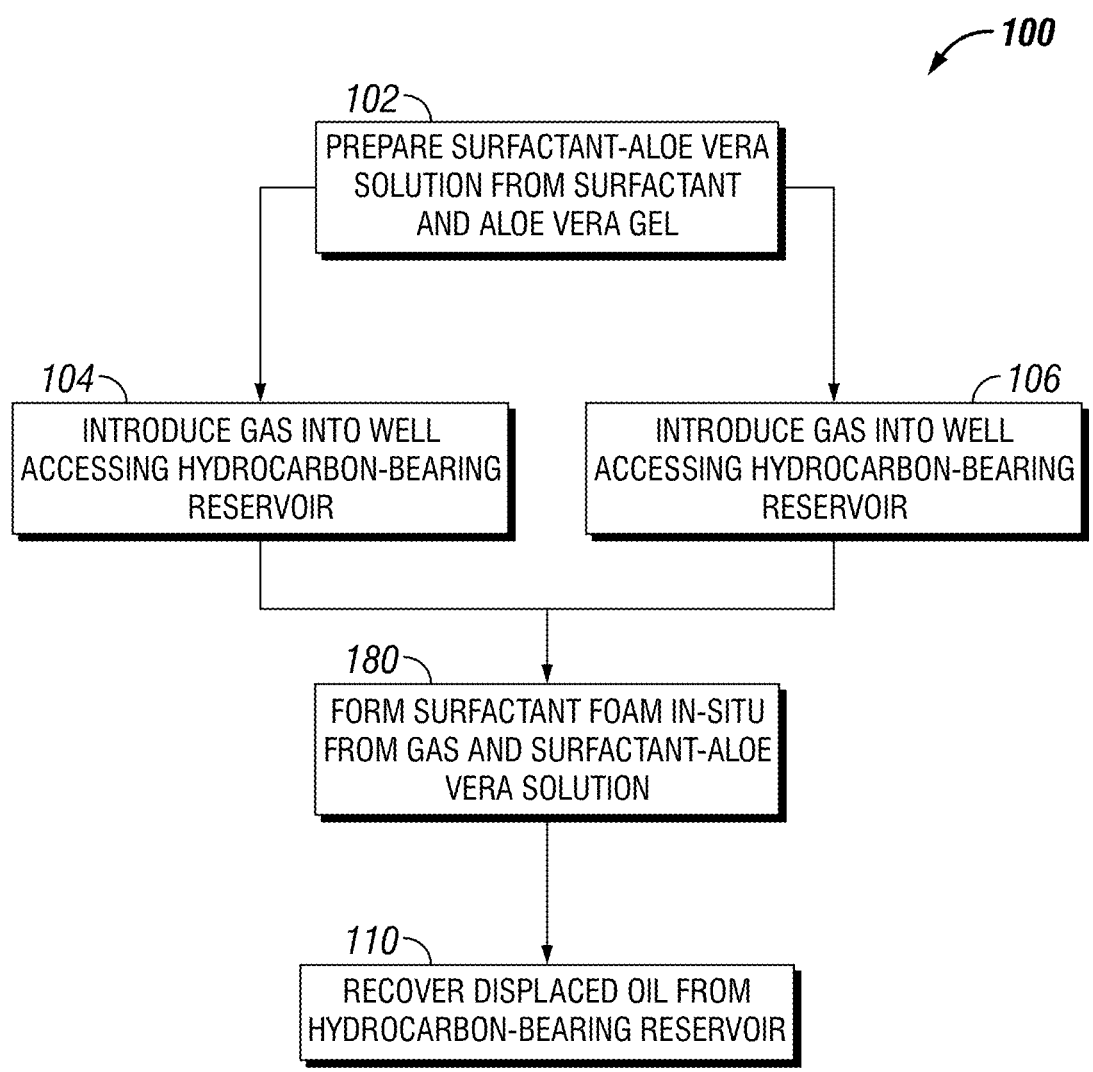
FIG. 1 is a flowchart of a process for preparing a surfactant foam having Aloe vera gel and enhancing oil recovery in a hydrocarbon-containing reservoir using the surfactant foam in accordance with an embodiment of the disclosure.

FIG. 1 depicts a process 100 for preparing a surfactant foam having *Aloe vera* gel and enhancing oil recovery in a hydrocarbon-containing reservoir using the surfactant foam for enhanced oil recovery in accordance with an embodiment of the disclosure. Initially, a surfactant-*Aloe vera* gel solution may be prepared (block 102). The surfactant-*Aloe vera* gel solution may be prepared at the surface. The solution may include water (for example, seawater), a surfactant, and *Aloe vera* gel. In some embodiments, the surfactant may be a methanol surface active agent foamer. A gas may be introduced into a well accessing the hydrocarbon-containing reservoir (block 104). For example, the well may be a production well or an injection well in a formation having hydrocarbon-containing reservoir. The surfactant-*Aloe vera* gel solution may also be introduced into the well (block 106). In some embodiments, the gas and surfactant-*Aloe vera* gel solution may be introduced simultaneously or separately.

The surfactant-*Aloe vera* gel and gas may form a surfactant foam in-situ in the well (block 108). After formation of the surfactant foam, displaced oil may be recovered from the hydrocarbon-bearing reservoir (block 110), such as from a production well accessing the reservoir. Advantageously, the surfactant foam formed from the surfactant-*Aloe vera* gel is more stable at a variety of reservoir conditions than a foam formed without the *Aloe vera* gel. The surfactant foam formed from the surfactant-*Aloe vera* gel may thus reduce the mobility of gas and improve the sweep efficiency of the oil recovery process as compared to other surfactant foams. Additionally, the *Aloe vera* gel provides a cost-effective and readily available component to increase the properties of the surfactant foam useful for the oil recovery process.

Examples

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

The following non-limiting example of a surfactant and *Aloe vera* gel foam in seawater was prepared and tested against seawater, a surfactant solution, and seawater and *Aloe vera* gel solution. The *Aloe vera* gel was obtained directly from the leaves of an *Aloe vera* plant. The gases used for foam generation were air and nitrogen ($N_2$). The experiments described supra were conducted at a temperature of 25° C. and a pressure of 90 psi for air and 1500 psi for nitrogen. The concentration of the surfactant was 10 gallon per thousand gallon (gpt), and the *Aloe vera* gel concentration was 2 wt %. The tests were conducted on four solutions: seawater; 10 gpt surfactant in seawater; 2 wt % *Aloe vera* gel in seawater; and 10 gpt surfactant and 2 wt % *Aloe vera* gel in seawater. Bubble sizes were visually observed for both solutions, and foam rheological properties were measured using a foam rheometer.

The solutions were prepared by dissolving measured volumes of surfactant in seawater to reach a 10 gpt solution, and then adding the *Aloe vera* gel to prepare the 2 wt % *Aloe vera* gel solution.

The foam rheology measurements were used to determine any increase in the gas apparent viscosity using the *Aloe vera* gel with the surfactant foam as compared to the surfactant foam without the gel.

Figure 2:
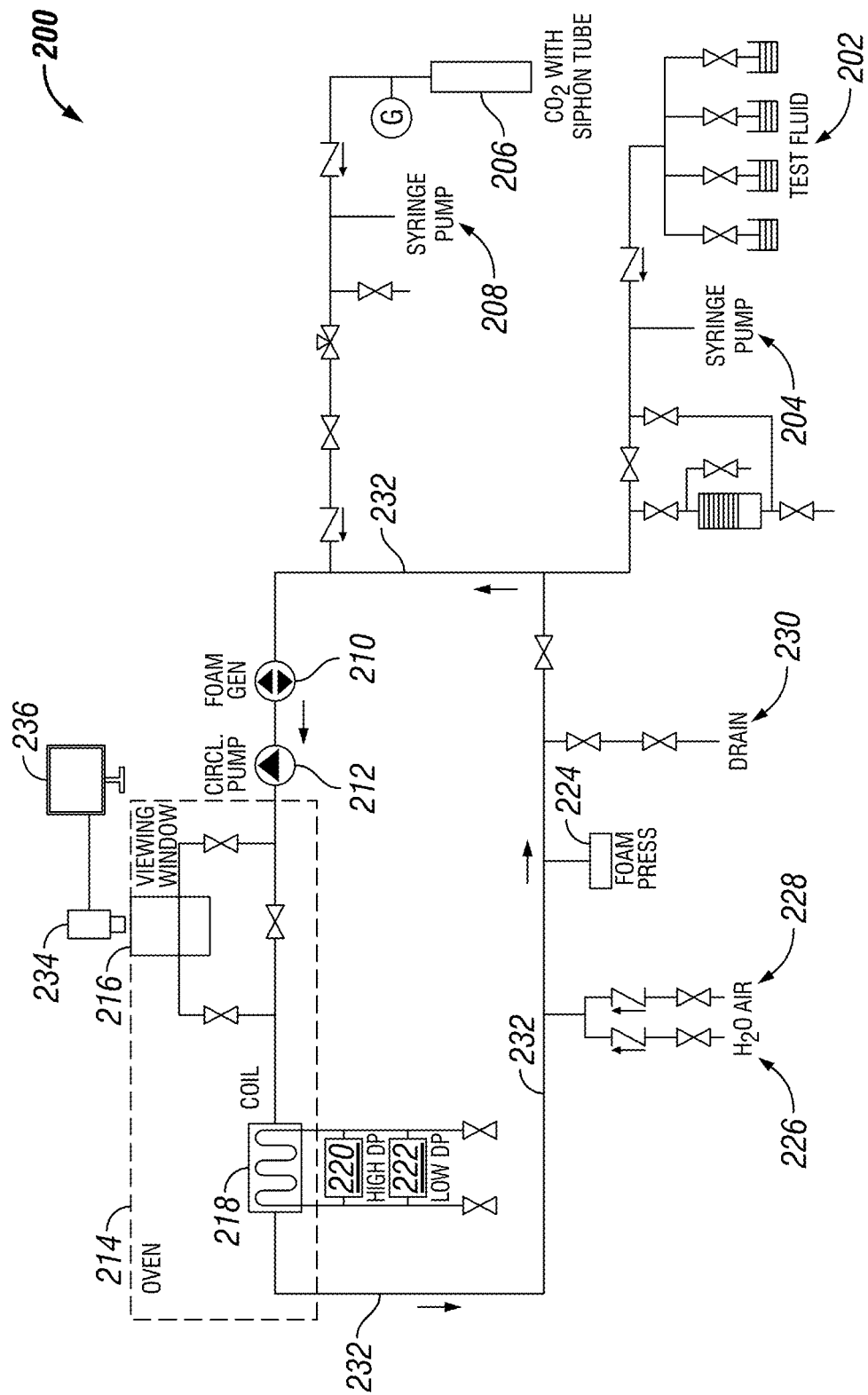
FIG. 2 is a schematic diagram of a rheometer apparatus used to conduct rheology measurements in accordance with an embodiment of the disclosure.

FIG. 2 depicts the rheometer apparatus 200 used to conduct the rheology measurements in accordance with an embodiment of the disclosure. The rheology apparatus includes test fluid reservoirs 202, a syringe pump 204, a $CO_2$ source 206, and a second syringe pump 208. The rheology apparatus 200 also includes a foam generator 210, a circulating pump 212, an oven 214 with a viewing window 216 and a heating coil 218, a first differential pressure meter 220, a second differential pressure meter 222, and a foam pressure meter 224. The rheology apparatus 200 also includes a water source 226, air source 228, and a drain 230. The piping or tubing of the rheometer apparatus 200 and some of the components enable circulation and monitoring in a foam loop 232 of the rheometer apparatus 200. The arrows depicted in FIG. 2 illustrate the flow direction of a generated foam in the foam loop 232.

FIG. 2 also depicts various valves for controlling flow of the fluid (numbering omitted for clarity). In some instances, the rheology apparatus 200 includes a camera 234 directed at the viewing window 216 and connected to a display 236.

A sample of a solution (for example, surfactant or mixture of surfactant and gel in seawater) was placed in the rheology apparatus 200 and allowed to reach equilibrium in the foam loop. Gas was then injected into the rheology apparatus and allowed to mix for two hours at a relatively low shear rate until the temperature and pressure stabilized. The mixture of solution and gas was then circulated in the foam loop and observed through the viewing cell to ensure foam generation.

The apparent viscosities were measured at different shear rates using the following equations:

$$\mu_{apparent} = \frac{\tau}{\gamma} \quad (1)$$

$$\tau = \frac{D \, \Delta P}{4L} \quad (2)$$

$$\gamma = \frac{8 \, V}{D} \quad (3)$$

Where $\mu_{apparent}$ is the apparent viscosity, $\tau$ is the shear stress, $\gamma$ is the shear rate, D is the tube diameter, $\Delta P$ is the differential pressure across the foam loop, L is the tube length, and V is the velocity.

The apparent viscosities of the solutions were measured at a temperature of 25° C. to ensure that the initial viscosities of the solutions were similar to that of water and to demonstrate the increase of foam viscosity when the surfactant or mixture of surfactant and gel are used to increase the gas viscosity. The initial apparent viscosities (in centipoise (cP)) of the solutions are shown in Table 1:

TABLE 1

APPARENT VISCOSITIES OF SOLUTIONS

| Solution | Viscosity at 25° C. |
|---|---|
| Seawater (SW) | 0.890 |
| SW with 10 gpt surfactant | 0.900 |
| SW with 2 wt % gel | 4.390 |
| SW with 10 gpt surfactant and 2 wt % gel | 25.0 |

As shown in Table 1, the surfactant and *Aloe vera* gel produced a significantly greater viscosity increase than the surfactant or *Aloe vera* gel alone.

Figure 3:
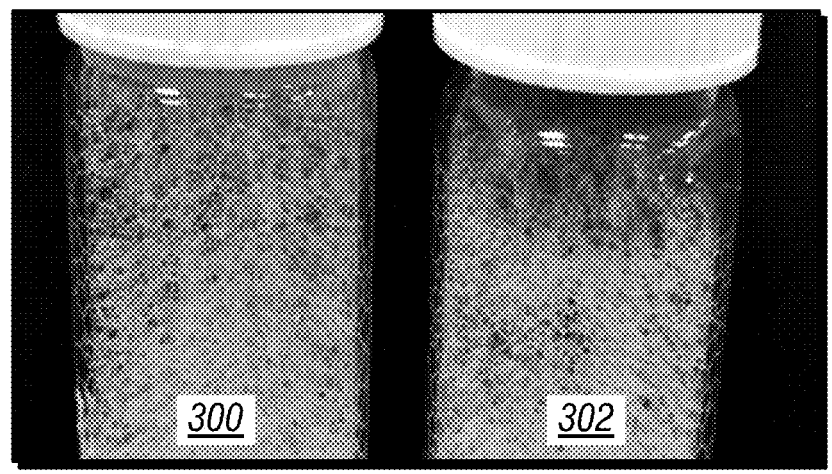
FIG. 3 are photographs of a foam generated from the surfactant solution and a foam generated from the surfactant-Aloe vera gel solution in accordance with an embodiment of the disclosure.

The bubble size of the foams generated from the surfactant solution and the surfactant-*Aloe vera* gel solution was observed during batch testing. The generated foams were observed at room temperature. FIG. 3 depicts a photograph 300 of the foam generated from the surfactant solution and a photograph 302 of the foam generated from the surfactant-*Aloe vera* gel solution in accordance with an embodiment of the disclosure. As shown in the photographs, the addition of the *Aloe vera* gel to the surfactant reduced the size of the gas bubbles of the generated foam. The smaller bubbles indicate a stronger and more stable foam that is harder to break and consequently remains intact for a longer time period as compared to foams having larger bubbles that may collapse within a shorter time period.

Figure 4:
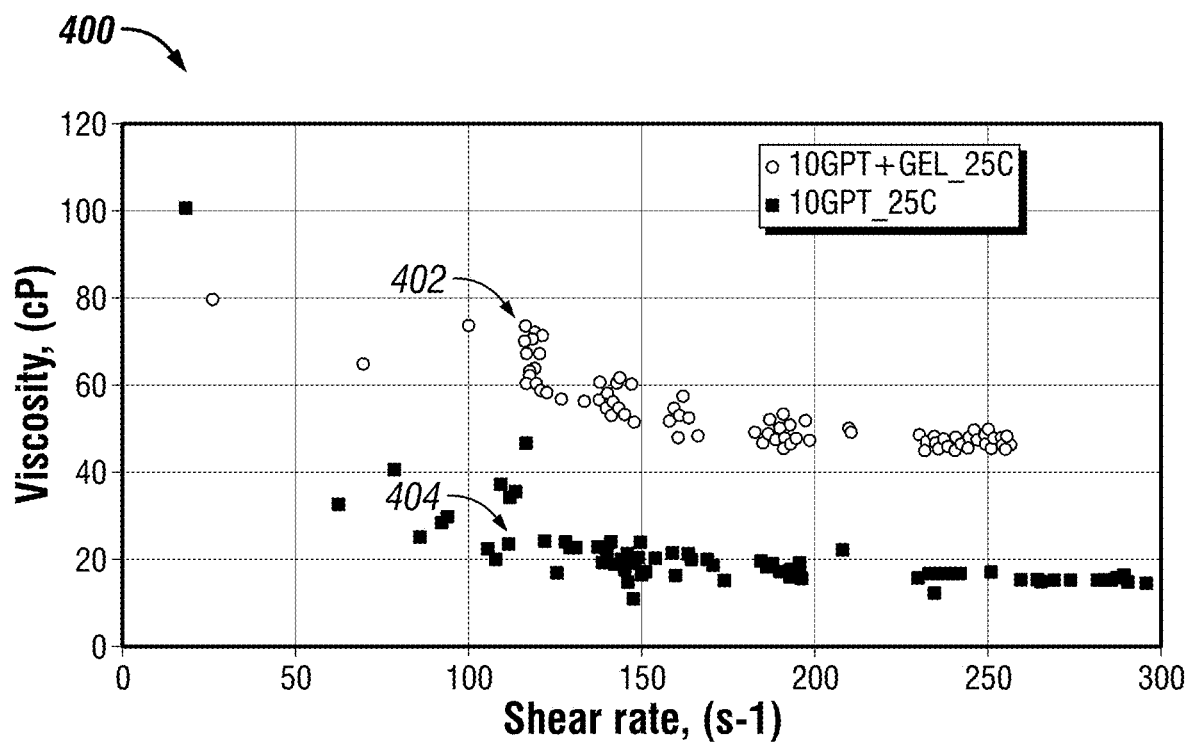
FIG. 4 is a plot of the measured apparent viscosities vs shear rate for a foam generated from the surfactant solution and a foam generated from a surfactant-Aloe vera gel solution using air at 25° C. in accordance with an embodiment of the disclosure.

A first test was conducted to measure the apparent viscosity of foams generated from the surfactant solution and the surfactant-*Aloe vera* gel solution using air at 25° C. FIG. 4 is a plot 400 of the measured apparent viscosities (in cP on the y-axis) vs shear rate (in $s^{-1}$ on the x-axis) in accordance with an embodiment of the disclosure. As shown in the plot 400, points 402 correspond to the measured apparent viscosities of the foam generated from the surfactant-*Aloe vera* gel solution, and points 404 correspond to the measured apparent viscosities of the foam generated from the surfactant solution.

As shown in FIG. 4, the addition of the *Aloe vera* gel to the surfactant solution increased the apparent viscosity of the generated foam and, consequently, increased the stability of the foam. The addition of 2 wt % of the *Aloe vera* gel doubled the average apparent viscosity of the generated foam from around about 20 cP to about 40 cP at 25° C.

Figure 5:
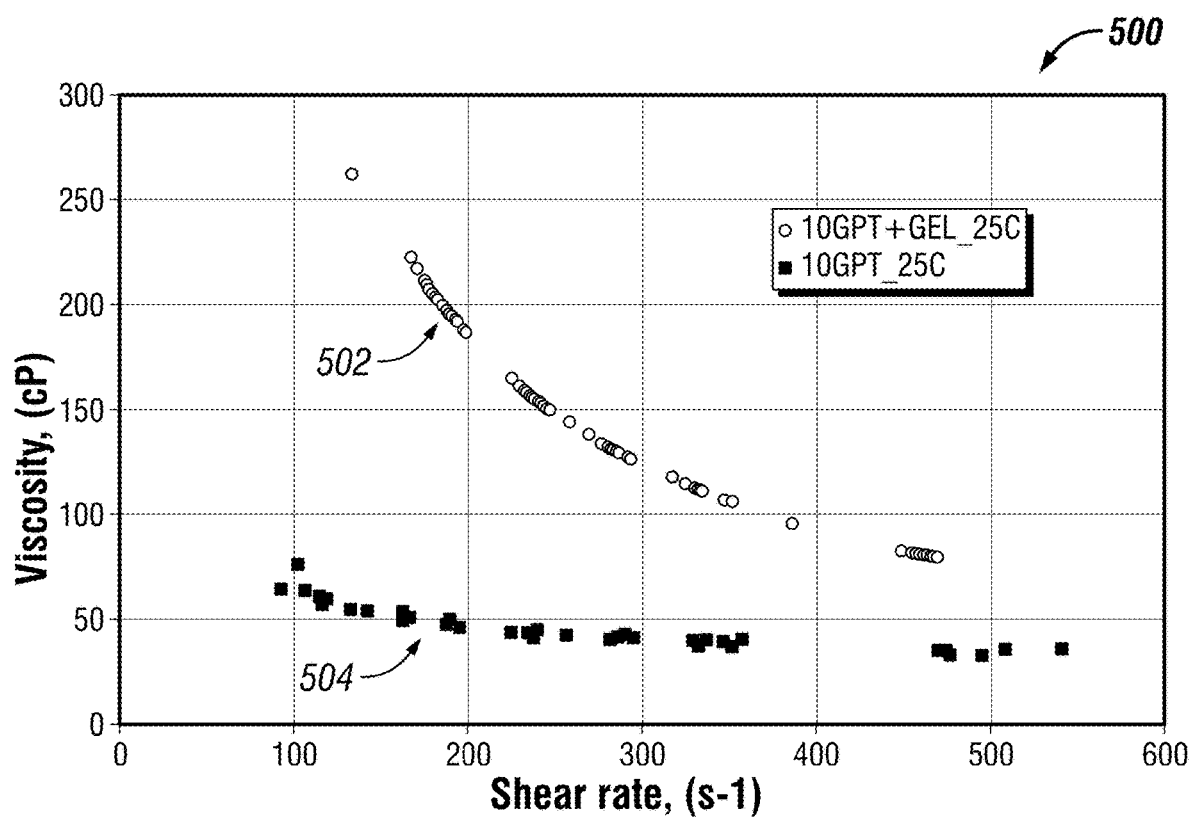
FIG. 5 is a plot of the measured apparent viscosities vs shear rate for a foam generated from the surfactant solution and a foam generated from a surfactant-Aloe vera gel solution using nitrogen at 25° C. in accordance with an embodiment of the disclosure.

A second test was conducted to measure the apparent viscosity of foams generated from the surfactant solution and the surfactant-*Aloe vera* gel solution using nitrogen at 25° C. FIG. 5 is a plot 500 of the measured apparent viscosities (in cP on the y-axis) vs shear rate (in $s^{-1}$ on the x-axis) in accordance with an embodiment of the disclosure. As shown in the plot 500, points 502 correspond to the measured apparent viscosities of the foam generated from the surfactant-*Aloe vera* gel solution, and points 504 correspond to the measured apparent viscosities of the foam generated from the surfactant solution As shown in FIG. 5, the addition of the *Aloe vera* gel to the surfactant solution again increased the apparent viscosity of the generated. The addition of 2 wt % of the *Aloe vera* gel increased the average apparent viscosity of the generated foam from about 50 cP to about 100 cP at 25° C.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for enhancing oil recovery in a hydrocarbon-containing reservoir, comprising:
   introducing a gas consisting of air or nitrogen into a well
      accessing the hydrocarbon-containing reservoir; and introducing a solution into the well such that the solution and gas form a foam, the solution comprising:

seawater;

a surfactant, wherein the surfactant has a concentration in the solution of 5 gallon per thousand gallon (gpt) to 15 gpt;

*Aloe vera* gel, wherein the Aloe veral gel has a concentration in the solution of 1 weight % (1 wt %) to 3 wt %, wherein when the gas consists of air the foam has an average apparent viscosity of 40 centipoise (cP) at 25° C. and when the gas consists of nitrogen the foam has an average apparent viscosity of 100 cP at 25° C., wherein gas bubbles of the foam are smaller than gas bubbles of a foam formed from a solution consisting of seawater and the surfactant.

2. The method of claim 1, wherein the solution consists of:

water;

a surfactant;

*Aloe vera* gel.

3. The method of claim 1, wherein the surfactant comprises a methanol surface active agent foamer.

4. The method of claim 1, wherein the surfactant comprises a combination of an amphoteric alkyl amine and propan-2-ol.

5. The method of claim 1, wherein the gas consists of air.

6. The method of claim 1, wherein the gas consists of nitrogen.

7. The method of claim 1, comprising preparing the solution at the surface before introducing the solution into the well.

* * * * *

UNITED STATES PATENT AND TRADEMARK OFFICE
CERTIFICATE OF CORRECTION

PATENT NO. : 11,447,687 B2
APPLICATION NO. : 17/036666
DATED : September 20, 2022
INVENTOR(S) : AlMatouq et al.

It is certified that error appears in the above-identified patent and that said Letters Patent is hereby corrected as shown below:

In the Claims

In Column 7, Claim 1, Line 7 should read:
-- Aloe vera gel, wherein the Aloe vera gel has a concentration --

Signed and Sealed this
Twenty-fifth Day of October, 2022

Katherine Kelly Vidal
*Director of the United States Patent and Trademark Office*